(12) United States Patent
Chiabaut

(10) Patent No.: US 7,907,613 B1
(45) Date of Patent: Mar. 15, 2011

(54) METHOD AND APPARATUS FOR MEASURING RTT IN A CUMULATIVE ACKNOWLEDGMENT TRANSMISSION PROTOCOL

(75) Inventor: Jérôme Jacques Jean Chiabaut, Ottawa (CA)

(73) Assignee: Avaya Inc., Basking Ridge, NJ (US)

( * ) Notice: Subject to any disclaimer, the term of this patent is extended or adjusted under 35 U.S.C. 154(b) by 2874 days.

(21) Appl. No.: 10/142,192

(22) Filed: May 9, 2002

(51) Int. Cl.
*H04L 12/28* (2006.01)
(52) U.S. Cl. .......................................... 370/394; 714/748
(58) Field of Classification Search ......................... None
See application file for complete search history.

(56) References Cited

U.S. PATENT DOCUMENTS

| | | | | |
|---|---|---|---|---|
| 5,307,351 | A | * | 4/1994 | Webster ......................... 370/470 |
| 6,694,471 | B1 | * | 2/2004 | Sharp ............................. 714/749 |
| 6,862,628 | B2 | * | 3/2005 | Moore et al. ................... 709/236 |
| 2003/0023746 | A1 | * | 1/2003 | Loguinov ....................... 709/235 |

OTHER PUBLICATIONS

Internet Engineering Task Force (IETF) Request for Comments (RFC) 793, Transmission Control Protocol, J. Postel, Sep. 1981.
IETF RFC 1323, TCP Extensions for High Performance, V. Jacobson, et al., May 1992.
IETF RFC 2018, TCP Selective Acknowledgement Options, M. Mathis, et al., Oct. 1996.
IETF RFC 2581, TCP Congestion Control, M. Allman, et al., Apr. 1999.
IETF RFC 2582, The NewReno Modification to TCP's Fast Recovery Algorithm, S. Floyd, et al., Apr. 1999.
IETF RFC 2883, An Extension to the Selective Acknowledgement (SACK) Option for TCP, S. Floyd, et al., Jul. 2000.
IETF RFC 2988, Computing TCP's Retransmission Timer, V. Paxson, et al., Nov. 2000.
IETF RFC 3042, Enhancing TCP's Loss Recovery Using Limited Transmit, M. Allman, et al., Jan. 2001.
[Karn 87], Improving Round-Trip Time Estimates in Reliable Transport Protocols, P. Karn, et al., Computer Communication Review, vol. 17, No. 5, pp. 2-7, Aug. 1987.

* cited by examiner

*Primary Examiner* — Bob A Phunkulh
(74) *Attorney, Agent, or Firm* — Anderson Gorecki & Manaras LLP

(57) ABSTRACT

Round-trip time estimates may be calculated from an acknowledgement of an original packet transmission or from an acknowledgment of a retransmission without ambiguity by using different segment sizes for the same packet during transmission and retransmission. By using different segment sizes, the retransmitted segment will be acknowledged with a different acknowledgement number. In one embodiment, a TCP sender uses segment sizes that are slightly smaller than the maximum segment size for the initial transmission (e.g. MSS-4 bytes), and uses maximally sized segments during retransmission. When one of the two transmissions is explicitly acknowledged, the TCP sender can then use the different byte sequence acknowledgement numbers to discern which transmission is being acknowledged and correctly measure the round-trip time. This also allows the TCP sender to initiate the NewReno fast recovery algorithm only upon receipt of a retransmission acknowledgment. This is especially useful, for example, during periods of rapidly increasing delays caused by deteriorating network conditions or increased congestion.

16 Claims, 2 Drawing Sheets

METHOD AND APPARATUS FOR MEASURING RTT IN A CUMULATIVE ACKNOWLEDGMENT TRANSMISSION PROTOCOL

BACKGROUND OF THE INVENTION

1. Field of the Invention

The present invention relates to network transmissions and, more particularly, to a method and apparatus for enhancing feedback information available in a cumulative acknowledgment transmission protocol, to allow network parameters such as the round-trip time to be measured during retransmission periods, and to accelerate loss recovery.

2. Description of the Related Art

Data communication networks may include various computers, servers, nodes, routers, switches, hubs, proxies, and other network devices coupled to and configured to pass data to one another. These devices will be referred to herein as "network devices." Data is communicated through the data communication network by passing data packets (or data cells or segments) between the network devices by utilizing one or more communication links between the devices. A particular packet may be handled by multiple network devices and cross multiple communication links as it travels between its source and its destination over the network.

The various network devices on the communications network communicate with each other using predefined sets of rules, referred to herein as protocols. The protocols will typically specify various aspects of what the data packets should look like and how they should be handled by the network devices. One aspect of a protocol may be to define whether packets are to be acknowledged by the receiving network device. Acknowledgements enable the sending network device to receive feedback as to how the network is handling the packets and whether the packets are reaching their intended destination.

One commonly used protocol, Transport Control Protocol (TCP), uses positive acknowledgements to allow the sending network device to assess network conditions and to adjust transmission parameters accordingly. The use of TCP acknowledgements and adjustment of transmission parameters are discussed in greater detail in IETF RFC 2581, the content of which is hereby incorporated by reference. TCP utilizes cumulative acknowledgements that indicate to the sending network device that the receiving device has received all data up to a particular point.

One of the parameters measured in TCP is the round-trip time (RTT). The round-trip time is the difference between the time a segment with a particular sequence number is sent, and the time an acknowledgment covering that sequence number is received. The round-trip time may be used in TCP to adjust transmission parameters in the sending network device to prevent the sending network device from transmitting too much data onto the network. Examples of transmission parameters derived from the round-trip time include, for example, the smoothed RTT, the smoothed RTT mean deviation, and the retransmission timeout. Use of the round-trip time to adjust transmission parameters is discussed in greater detail in IETF RFC 2988, the content of which is hereby incorporated by reference.

Measurement of the round-trip time may be particularly important in a network that has varying time delays over links connecting network nodes, for example in a wireless network where the link between the end user and the base station may be transitory or where environmental or other conditions may affect the available bandwidth between the sender and the base station. In the event of rapidly deteriorating network conditions, it is desirable to measure the round-trip time often, possibly on every packet, to continually assess network conditions.

If an acknowledgment is not received within a certain period of time, as measured by a retransmission timer, the sending network device will assume that the packet was lost in the network and will retransmit the packet. Numerous other conditions may also cause a retransmission, for example, where a packet is damaged or where acknowledgments from other packets indicate that a particular packet was likely to have been lost.

Unfortunately, the sending network device cannot discern between an acknowledgment associated with the originally transmitted packet or the retransmitted packet. This results in a problem known as retransmission ambiguity. Specifically, when a TCP sender receives an acknowledgement for a packet that has been transmitted more than once, the sender has no way of knowing which of the multiple transmissions is being acknowledged. If, on the other hand, the first transmission was indeed lost and the sender receives an acknowledgement for the retransmitted packet it can only guess, sometimes incorrectly, that the packet following the retransmitted one was lost as well. The effects of retransmission ambiguities on TCP's Fast Recovery Algorithm are discussed in greater detail in IETF RFC 2582, the content of which is hereby incorporated by reference.

One way to avoid retransmission ambiguity is to use a time stamp to uniquely identify packets with acknowledgments, see IETF RFC 1323, the content of which is hereby incorporated by reference. This solution, unfortunately, is not optimal since it has a relatively high bandwidth overhead, as the timestamp typically adds 12 bytes to the 40-byte TCP/IP header of a TCP segment. This overhead can be quite significant in low bandwidth or asymmetric channel environments (e.g. wireless access networks). Additionally, some clients do not support timestamps (e.g. Windows NT) and it is disabled by default in other versions of Windows. Accordingly, implementation is difficult since it requires modification to end user software.

Another solution, originally proposed by Karn and Partridge and described in IETF RFC 2988, is to not use the acknowledgements of packets that have been transmitted more than one time when making round-trip time measurements. While this removes the ambiguity caused by retransmissions, it excludes valuable opportunities for measuring the round-trip time. This may be particularly important in the event that the delay is caused by rapidly changing network conditions. In this situation, the acknowledgement for the retransmitted packet may be the first positive indication that the sender would have had of the change in network conditions.

SUMMARY OF THE INVENTION

The present invention overcomes these and other drawbacks by providing an apparatus and method for improving feedback from acknowledgments in a cumulative acknowledgment protocol to enable round-trip time calculations to be made from the original packet transmission as well as any required packet retransmissions, and to avoid retransmission avalanches that may otherwise occur when utilizing the NewReno algorithm. Specifically, the method and apparatus of the present invention uses different packet sizes during transmission and retransmission so that the acknowledgment for a retransmitted packet will appear to the sending network device different from the acknowledgment for the originally transmitted packet. In one embodiment, the TCP sender uses segment sizes that are slightly smaller than the maximum segment size for the initial transmission (e.g. MSS-4 bytes), and uses maximally sized segments during retransmission. When one of the two transmissions is explicitly acknowledged, the TCP sender can then use the different byte sequence acknowledgement numbers to discern which transmission is being acknowledged. This allows the round-trip time to be calculated from either the transmission—transmission acknowledgment pair or the retransmission—retransmission acknowledgment pair. Additionally, this allows the network device to discern retransmission acknowledgments from original acknowledgments, and initiate the NewReno algorithm only upon receipt of a retransmission acknowledgment.

According to one aspect of the invention, a method of transmitting data over a network, the method includes transmitting a first packet having a first packet size, and retransmitting the first packet as a second packet having a second packet size. The method may also include discerning that retransmission of the first packet is required prior to the step of retransmitting the first packet, e.g., by waiting for a first acknowledgment of the first packet for a predetermined period of time or determining that the first packet is likely to have not been received or is likely to have been damaged. The round-trip time may then be calculated based on the acknowledgment of the first packet or the acknowledgment of the second packet. One or more transmission parameters may be calculated or adjusted based on the calculated round-trip time.

According to another aspect of the invention, a network device includes control logic configured to cause the network device to transmit a first packet having a first packet size, and if necessary, cause the network device to retransmit the first packet as a second packet having a second packet size. The control logic may further be configured to cause the network device to compute a first round-trip time based on a first packet acknowledgement of the first packet, and cause the network device to compute a second round-trip time based on a second packet acknowledgement of the second packet. Optionally, the control logic may be further configured to update at least one network transmission parameter based at least in part on at least one of the first round-trip time and the second round-trip time. The control logic may be a finite state machine or may be configured to implement software.

According to yet another aspect of the invention, a computer readable medium for storing software for use in a transmission protocol contains software for use in performing the steps of transmitting a first packet having a first packet size, discerning that retransmission of the first packet is required, and retransmitting the first packet as a second packet having a second packet size. Retransmission may be required upon expiration of a predetermined period of time, where the first packet is likely to have not been received, or where the first packet is likely to have been damaged. The round-trip time may then be based on an acknowledgment of the first packet or on an acknowledgment of the second packet. The round-trip time may be used to update transmission parameters.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, the method and apparatus of the present invention enable round-trip time estimates to be calculated from an acknowledgement of the original packet transmission or from an acknowledgment of a retransmission without ambiguity. This is especially useful, for example during periods of rapidly increasing delays caused by deteriorating network conditions or increased congestion. Specifically, the method and apparatus of the invention uses different segment sizes during transmission and retransmission so that a retransmitted segment will be acknowledged with a different acknowledgement number. In one embodiment, the TCP sender uses segment sizes that are slightly smaller than the maximum segment size for the initial transmission (e.g. MSS-4 bytes), and uses maximally sized segments during retransmission. When one of the two transmissions is explicitly acknowledged, the TCP sender can then use the different byte sequence acknowledgement numbers to discern which transmission is being acknowledged.

Figure 1:
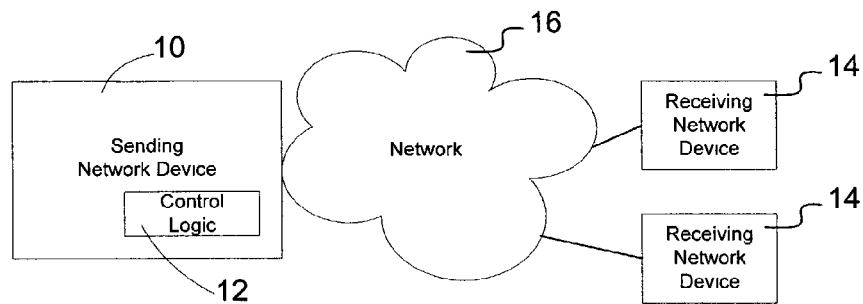
FIG. 1 is a functional block diagram network according to one aspect of the invention.

One aspect of the invention is set forth in greater detail in FIG. 1. As shown in FIG. 1, a sending network device 10 having control logic 12 is configured to communicate with other receiving network devices 14 over a network 16. The control logic 12 is configured to implement a protocol to facilitate this communication, one aspect of which provides for receipt of acknowledgment messages generated by the receiving network device 14 upon receipt of the segment.

Occasionally, a sending network device 10 will not receive an acknowledgement message for a particular packet within an expected period of time. Alternatively, the sending network device 10 may receive acknowledgment messages from the receiving network device of other packets that indicate that a particular packet may have been damaged or lost. In either situation, the control logic of the sending network device 10 is configured to retransmit the packet over the network 16 to the receiving network device 14. The receiving network device 14 will thereafter confirm receipt of the retransmitted packet through generation of a second acknowledgment.

To enable the sending network device 10 to discern between an acknowledgment of the original packet and an acknowledgment of the retransmitted packet, the control logic 12 of the sending network device 10, according to one aspect of the invention, is configured to use a first packet size for the original transmission and a second packet size for the retransmission. By, using segments of different sizes, each acknowledgement will carry a different, unique byte sequence number. The unique sequence numbers eliminate the ambiguities caused by retransmissions.

Sizing the packets differently enables the sending network device to discern in the acknowledgment message which of the two packets is being acknowledged. This enables the sending network device to calculate the round-trip time of the packet over the network without ambiguity as to which of the two transmissions is being acknowledged. For example, in TCP, acknowledgement messages are cumulative, meaning that they will specify that the receiving network device has all data up to a given point. By altering the end points of the transmitted data in the original transmission and the retransmission, the acknowledgments will specify a different end point and are therefore distinguishable to the sending network device 10.

Figure 2:
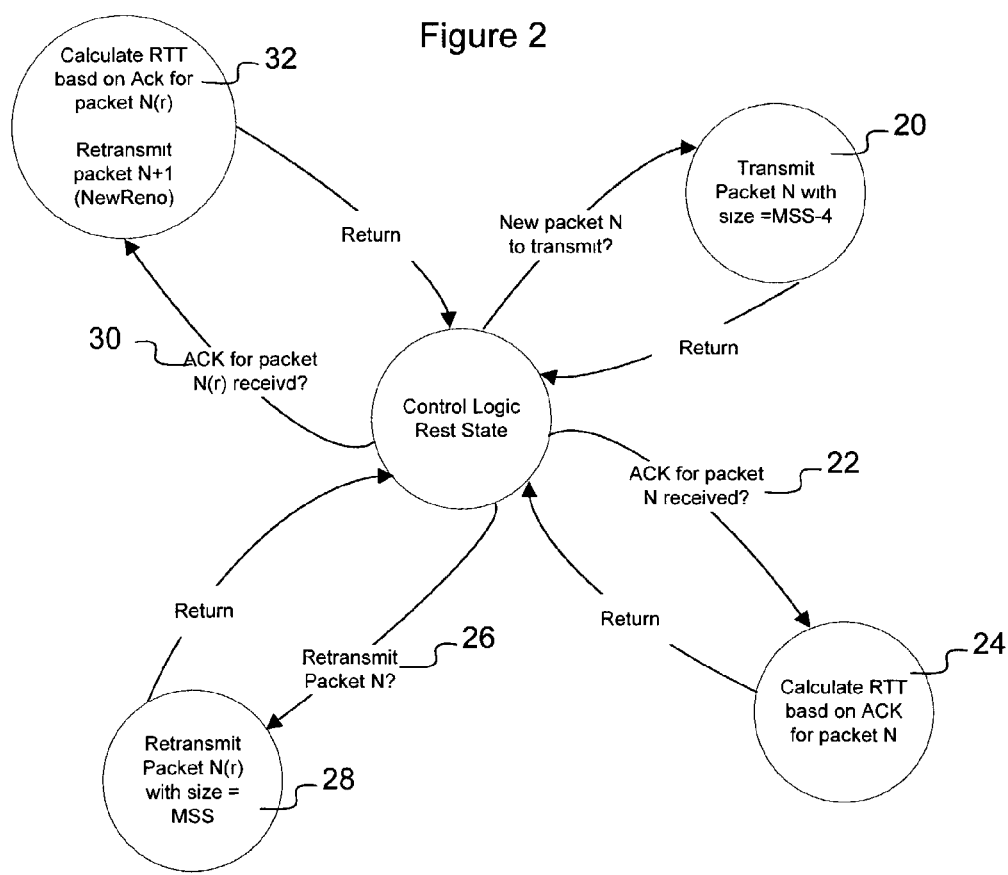
FIG. 2 is a state diagram of control logic used in connection' with one embodiment of the' invention.

The control logic 12 of network device 10, in one embodiment of the invention, is a finite state machine that is defined by the state diagram of FIG. 2. Finite state machines are well known in the art and may be implemented in a variety of ways. For example, a finite state machine may be implemented by an appropriately programmed microprocessor or programmable logic array. The details of implementation are a function of the available technology and are well within the skill of those knowledgeable in the art. For the sake of brevity, the details of finite state machine implementation are not shown or described for this illustrative embodiment. However, finite state machines are customarily defined in terms of the sequence of states of the machine and operations to be executed in each state. FIG. 2 represents such a state diagram of the control logic 12. It shows the states and state transitions and indicates, by means of notation, certain functions executed by the control logic 12. The state diagram and functions of the control logic 12 are described in detail further below.

As shown in FIG. 2, the control logic 12 causes the network device 10 to transmit packet N with a size equal to the maximum allowable segment size (MSS) reduced by a small amount (20). In the illustrated example, the network device transmits a packet with a size set to MSS-4 bytes. The invention is not limited to a packet size of MSS-4, but rather extends to other values as well. A packet size of MSS-4 was chosen in this example to preserve 32-bit memory alignment for efficiency in end systems.

The control logic then waits to receive an acknowledgment of the packet N. If an acknowledgment for packet N is received before the retransmission timer expires (22), the control logic calculates the RTT based on the acknowledgment for packet N (24) and returns. If an acknowledgement for packet N is not received before the retransmission timer expires (26), the control logic causes the network device to retransmit the packet N(r) with a size different than the original packet size (28) (the retransmission of packet N is denoted as "N(r)"). In the illustrated embodiment the selected retransmission size is equal to the maximum segment size, although the invention is not limited in this manner, as long as the packet size is of different value than the original packet size.

The control logic then returns to wait for an acknowledgment of the original packet or the retransmitted packet. If the control logic receives an acknowledgment for the original packet N (22), it calculates the round-trip time based on that acknowledgement (24) and returns. If the control logic receives an acknowledgement for the retransmitted packet N(r) (30), the control logic calculates the round-trip time based on the acknowledgment for the retransmitted packet N(r) (32) and returns or initiates fast recovery as appropriate.

If the retransmission is unnecessary, the retransmission with an additional four bytes is not necessary, and will be ignored upon receipt by the receiving network device 14. If the originally transmitted packet was lost, the receiving network device 14 will use the extra four bytes of information and continue receiving packets as normal. Configuring the transmitting network device in this manner enables the network device to compute the round-trip time from both the original transmission and from retransmissions without requiring modification of the receiving network device or any intervening network devices on the network.

Additionally, configuring the transmitting network device in this manner enables the sending network device to utilize the NewReno modification to TCP's fast recovery algorithm discussed in IETF RFC 2582 without experiencing a retransmit avalanche. Specifically, the NewReno algorithm specifies that if a sending network device receives an acknowledgment to a re-transmitted packet, than it should infer that at least the packet following the originally transmitted packet was lost. Unfortunately, since acknowledgements of retransmissions have been here-to-fore indistinguishable from acknowledgments of the original packet, sending network devices are prone to start a retransmission avalanche by interpreting an acknowledgment of the original packet as an acknowledgment of the retransmitted packet. This misinterpretation causes the sending network device to infer, wrongly, that other packets have been lost when, in fact, no packets have been lost.

According to this aspect of the invention, by differentiating unambiguously between the originally transmitted packet and the retransmitted packet, the sending network device can discern whether the acknowledgment is of the originally transmitted packet or the retransmitted packet, and will only utilize the NewReno algorithm with respect to acknowledgments of retransmissions.

As shown in FIG. 2, if the sending network device is configured to implement the NewReno modification to TCP's fast recovery algorithm, when the control logic receives an acknowledgement for the retransmitted packet N(r) (30), the control logic will additionally cause the network device 10 to retransmit packet N+1 (32), since it will be able to assume that the packet transmitted after packet N was lost and cause it to be retransmitted as well without waiting for the retransmission timer to expire for that packet N+1. Since the retransmission of packet N (including the extra four bytes) has been acknowledged, the retransmission of packet N+1 will start at the end of packet N(r). Thus, the retransmission N+1(r) of packet N+1 will have a different byte sequence number from the original transmission of packet N+1, since the transmission start points will be different. Therefore packet N+1(r) will be distinguishable by the TCP sender from the original transmission N+1 even if both packets are of the same size. Optionally, the retransmission N+1(r) may also have a size different from the original transmission of packet N+1.

Figure 3:
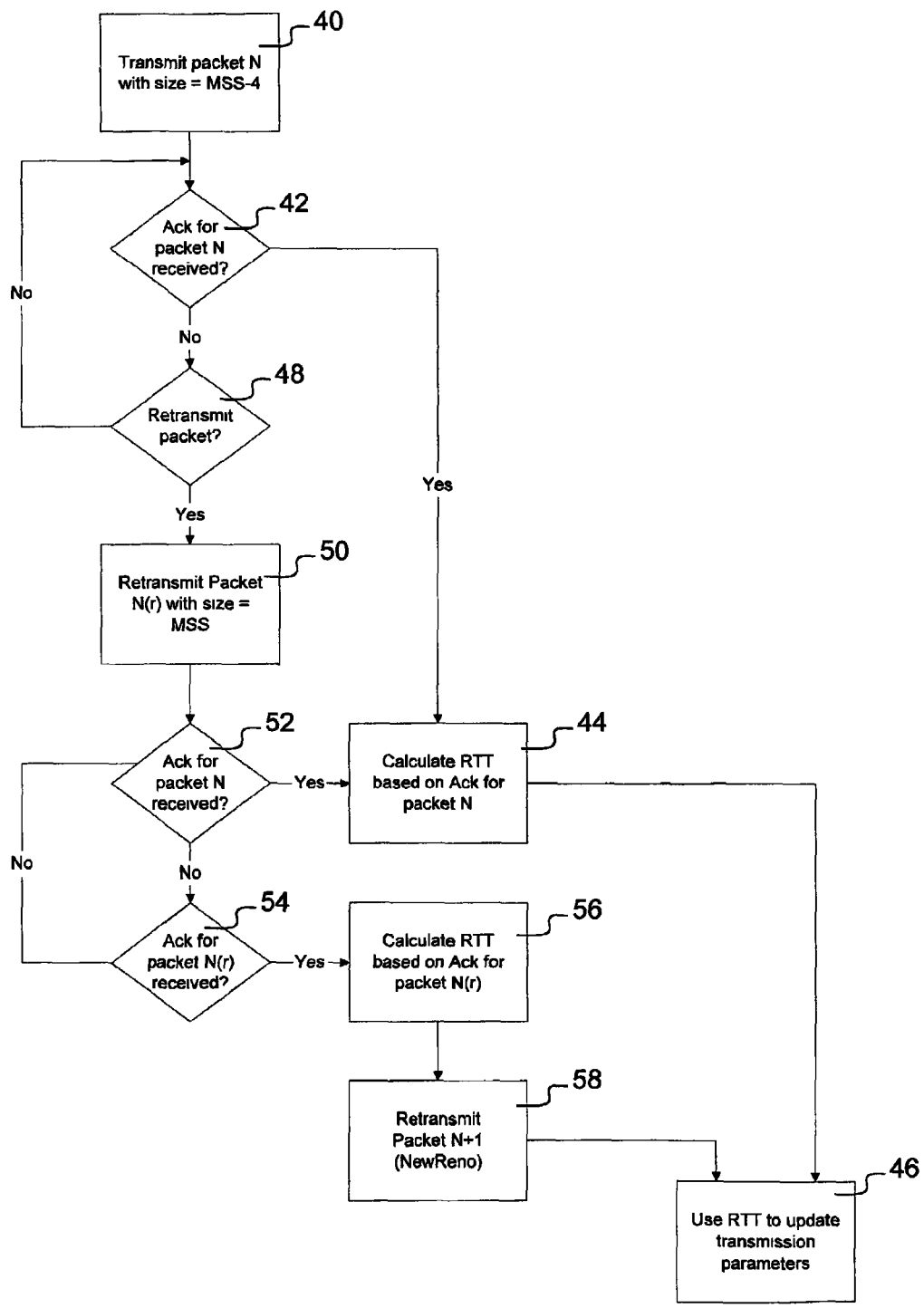
FIG. 3 is a flowchart of an example of software that can be used to implement one embodiment of the invention.

In another embodiment, software is written to perform the functions of the relevant portions of the flowchart shown in FIG. 3, and a processor of control logic 12 executes this software. Alternatively, some or all of the control logic 12 could be special purpose hardware, such as contained in an application specific integrated circuit, designed to perform functions of relevant portions of the flowchart shown in FIG. 3.

As shown in FIG. 3, in this embodiment, the control logic initially causes the network device 10 to transmit a packet N with a first segment size, for example equal to MSS-4 bytes (40). If the packet N is acknowledged (42), the round-trip time is calculated based on the acknowledgment for packet N (44) and the calculated round-trip time is used to update transmission parameters (46) for the sending network device 10.

If an acknowledgement for packet N is not received, the software will check to see if a wait timer has expired (48). When the wait timer expires or a retransmission is otherwise required, the software will cause the network device 10 to retransmit the packet N with a different segment size. In the illustrated example, the segment size is equal to the maximum segment size (50), although the invention is not limited in this regard. If an acknowledgement is received for packet N (52), the round-trip time is calculated based on the acknowledgment for packet N (44) and the transmission parameters are updated given the new round-trip time calculation (46). If an acknowledgement is received for packet N(r) (54), the round-trip time is calculated based on the acknowledgment for packet N(r) (56) and the new round-trip time calculation is used to update transmission parameters (46) for the network device 10. If the network device 10 is configured to implement the NewReno algorithm, the software will also, according to one embodiment of the invention, cause the network device to retransmit the packet N+1 (58) as discussed in greater detail above.

The control logic 12 of network device 10 may be implemented as a set of program instructions that are stored in a computer readable memory within the network device 10 and executed on a microprocessor within the network device 10. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can, be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

The preceding description has focused on an embodiment of the invention in which TCP is used as the communications protocol. The invention is not limited in this regard, however, as the invention can be applied more broadly to other protocols that use cumulative acknowledgements to control the transmission of information.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of transmitting a byte-stream of data over a network using an acknowledgment process to verify transmission of bytes of data in the byte-stream over the network, the method comprising the steps of:

transmitting, by a transmitting device on the network, a first packet having a first number of bytes of data in the byte-stream so that the first packet has a first packet size, the transmitting device utilizing the acknowledgment process to verify transmission of the first number of bytes of data in the byte-stream over the network by requiring acknowledgment of receipt of the first packet by a receiving device on the network;

failing to receive acknowledgment of receipt of the first packet from the receiving device prior to expiration of a retransmit timer;

retransmitting, by the transmitting device on the network, at least some of the bytes of data in the byte-stream from the first packet, but not exactly the same number of bytes in the byte-stream from the first packet, as a second packet, the second packet having a second packet size different from the first packet size;

receiving a first acknowledgment of receipt from the receiving device, the first acknowledgement of receipt including a first byte sequence number indicating to the transmitting network device that the receiving device has received the first number of bytes of data included in the first packet;

receiving a second acknowledgment of receipt from the receiving device, the second acknowledgment of receipt including a second byte sequence number indicating to the transmitting network device that the receiving device has received the second number of bytes of data included in the second packet;

wherein the first byte sequence number is different from the second byte sequence number to enable the transmitting device to discern whether the receiving device is acknowledging receipt of the first packet or the second packet.

2. The method of claim 1, further comprising a step of calculating a first round-trip time based on the first acknowledgment of receipt.

3. The method of claim 2, further comprising a step of calculating a second round-trip time based on the second acknowledgment of receipt.

4. The method of claim 1, further comprising the steps of:

transmitting a third number of bytes of data in the byte-stream as a third packet after the step of transmitting the first packet and before the step of retransmitting the first packet as a second packet, the third packet having a third byte sequence number calculated based on the first byte sequence number and the third number of bytes; and retransmitting the third number of bytes of data in the byte stream as a fourth packet upon receipt of an acknowledgment of the second packet, the fourth packet having a fourth byte sequence number calculated based on the second byte sequence number and the third number of bytes.

5. The method of claim 1, wherein the first packet size is smaller than the second packet size.

6. The method of claim 1, wherein the first packet size is equal to a maximum allowable packet size minus a small quantity, and wherein the second packet size is equal to a maximum allowable packet size.

7. A network device, comprising:

control logic configured to:

cause the network device to transmit a first packet having a first number of bytes of data in the byte-stream so that the first packet has a first packet size, the network device utilizing an acknowledgment process to verify transmission of the first number of bytes of data in the byte-stream over the network by requiring acknowledgment of receipt of the first packet by a receiving device on the network;

determine that retransmission of the first packet is required because of a failure to receive acknowledgment of receipt of the first packet;

cause the network device to retransmit at least some of the bytes of data in the byte-stream from the first packet, but not exactly the same number of bytes in the byte-stream from the first packet, as a second packet, the second packet having a second packet size different from the first packet size;

receive a first acknowledgment of receipt from the receiving device, the first acknowledgement of receipt including a first byte sequence number indicating to the transmitting network device that the receiving device has received the first number of bytes of data included in the first packet; and receive a second acknowledgment of receipt from the receiving device, the second acknowledgment of receipt including a second byte sequence number indicating to the transmitting network device that the receiving device has received the second number of bytes of data included in the second packet;

wherein the first byte sequence number is different from the second byte sequence number to enable the transmitting device to discern whether the receiving device is acknowledging receipt of the first packet or the second packet.

8. The network device of claim 7, wherein the control logic is further configured to:

if a first packet acknowledgement of the first packet is received, cause the network device to compute a first round-trip time based on the first packet acknowledgement of the first packet; and if a second packet acknowledgment of the second packet is received, cause the network device to compute a second round-trip time based on the second packet acknowledgement of the second packet.

9. The network device of claim 8, wherein the control logic is further configured to update at least one network transmission parameter based at least in part on at least one of the first round-trip time and the second round-trip time.

10. The network device of claim 7, wherein the control logic is a finite state machine.

11. The network device of claim 7, wherein the control logic implements software.

12. A tangible computer readable medium containing instructions for controlling at least one processor to perform a method of transmitting data over a network, the method comprising the steps of:

transmitting, by a transmitting device on the network, a first packet having a first number of bytes of data in the byte-stream so that the first packet has a first packet size, the transmitting device utilizing an acknowledgment process to verify transmission of the first number of bytes of data in the byte-stream over the network by requiring acknowledgment of receipt of the first packet by a receiving device on the network;

discerning that retransmission of the first packet is required;

retransmitting, by the transmitting device on the network, at least some of the bytes of data in the byte-stream from the first packet, but not exactly the same number of bytes in the byte-stream from the first packet, as a second packet, the second packet having a second packet size different from the first packet size;

receiving a first acknowledgment of receipt from the receiving device, the first acknowledgement of receipt including a first byte sequence number indicating to the transmitting network device that the receiving device has received the first number of bytes of data included in the first packet;

receiving a second acknowledgment of receipt from the receiving device, the second acknowledgment of receipt including a second byte sequence number indicating to the transmitting network device that the receiving device has received the second number of bytes of data included in the second packet;

wherein the first byte sequence number is different from the second byte sequence number to enable the transmitting device to discern whether the receiving device is acknowledging receipt of the first packet or the second packet.

13. The tangible computer readable medium of claim 12, wherein the step of discerning that retransmission is required comprises waiting for a first acknowledgment of the first packet and determining that retransmission is required upon expiration of a predetermined period of time.

14. The tangible computer readable medium of claim 12, wherein the step of discerning that retransmission is required comprises determining that the first packet is likely to have not been received or that the first packet is likely to have been damaged.

15. The tangible computer readable medium of claim 12, further comprising at least one of the step of calculating a first round-trip time based on an acknowledgment of the first packet, and calculating a second round-trip time based on an acknowledgment of the second packet.

16. The tangible computer readable medium of claim 15, further comprising the steps of:

transmitting a third packet after the step of transmitting the first packet and before the step of retransmitting the first packet as a second packet; and retransmitting the third packet upon receipt of an acknowledgment of the second packet.

* * * * *